2,991,305
CONVERSION OF UNSATURATED ALDEHYDES TO MONOMERIC PRODUCTS

Seaver A. Ballard, Orinda, and Edward A. Youngman, Lafayette, Calif., assignors to Shell Oil Company, a corporation of Delaware
No Drawing. Filed Dec. 29, 1958, Ser. No. 783,092
10 Claims. (Cl. 260—486)

This invention relates to the preparation of valuable monomeric products from acrolein. More particularly, this invention relates to the preparation of allyl acrylate and allyl alcohol from acrolein.

Allyl acrylate is a compound which has a wide variety of potentially important applications, particularly in the field of polymeric plastic and resinous materials. Thus, allyl acrylate is a valuable polymer-forming compound; further, it is a source of acrylic acid, and of other esters of acrylic acid. These other esters can be made either via esterification of the acrylic acid formed from allyl acrylate or via ester interchange by direct reaction with the alcohol corresponding to the desired other ester.

However, utilization of the potentially valuable properties of allyl acrylate, and its development as a valuable raw material, have not been feasible until recently, because it has not been until recently that there has been available an efficient process for preparing it on the necessary large scale at sufficiently low cost.

A potentially useful process for preparing allyl acrylate is that involving the so called Tischenko reaction, wherein an aldehyde is condensed to form the corresponding ester of the corresponding acid, the condensation being effected by means of an aluminum alcoholate. Until 1950, it was not known that the Tischenko reaction could be applied successfully to the preparation of allyl acrylate from acrolein. Many earlier attempts had been made to effect that reaction, but all had failed because of the highly reactive materials involved had polymerized and/or resinified and monomeric allyl acrylate was not formed. In 1950, U.S. Patent No. 2,516,627 was granted for what has been until recently, the only process known to us for successfully condensing acrolein to allyl acrylate by means of aluminum alcoholates as condensing agents. Recently, we and our coworkers investigated the process of that patent, and it was found that while the process described therein effected substantial condensation of acrolein to allyl acrylate, there occurred a further substantial transformation of acrolein to useless polymeric and/or resinous products. It was then discovered that substantially quantitative transformation of acrolein to monomeric products, rather than polymeric products, could be obtained by deliberately limiting the conversion of acrolein permitted. It was found that after the acrolein and catalyst were mixed, as time passed, there was formed first tri(allyloxy)-aluminum (by reaction of the aluminum alcoholate catalyst with the acrolein). Then acrolein condensation to allyl acrylate occurred, as substantially the only reaction. After a substantial conversion of acrolein has occurred, formation of polymeric materials suddenly began to take place, with consequent reduction in the condensation of the acrolein to allyl acrylate. It was found that by terminating the reaction at, or slightly before, the level of acrolein conversion at which formation of polymeric products began, the products of the reaction were substantially only monomeric, with little or no polymeric products.

That process, which is the subject of copending application Serial No. 783,094 filed December 29, 1958, provides an efficient, direct means to prepare allyl acrylate from acrolein. However, the process requires that a substantial part—often more than 50%—of the acrolein charged remain unreacted. Consumption of the remainder of the acrolein is essential to the economic feasibility of the process. As will be pointed out in detail hereinafter, the unreacted acrolein may be recovered in an anhydrous form suitable for recycle. However, because of the highly reactive nature of acrolein, in many cases it may be desirable to avoid recycle of the unreacted acrolein. It is therefore important that there be available a way for usefully consuming the unreacted acrolein which does not involve recycle of that acrolein.

By adding sufficient catalyst, it would appear possible to transform to allyl alcohol the acrolein not condensed to allyl acrylate. As has already been pointed out, the aluminum alcoholates suitable as catalyst in condensing acrolein to allyl acrylate react with the acrolein, at least a major part of the alkoxy groups of the catalyst being replaced by allyloxy groups, with concomitant formation of the ketone or aldehyde corresponding to the alkoxy groups of the aluminum alcoholate. The resulting aluminum alcoholate, primarily tri(allyloxy)aluminum, can be hydrolyzed with water or an aqueous solution of strong acid or base, the allyloxy groups being converted to allyl alcohol. It appears that the acrolein not condensed to allyl acrylate might be transformed to allyl alcohol by adding sufficient catalyst to react with all of the acrolein not condensed, then hydrolyzing the resulting tri(allyloxy)aluminum. However, such a process for consuming the acrolein not condensed to allyl acrylate is not practically feasible for at least two reasons: first, the reaction of the acrolein with the catalyst goes forward much faster than does the acrolein condensation reaction. Consequently, it has been found that large concentrations of catalyst—amounts sufficient to consume all the acrolein not condensed—actually will reduce the yield of allyl acrylate. Second, use of small amounts of catalyst to effect the acrolein condensation, followed by later addition of sufficient catalyst to react with the acrolein which has not been condensed, is not economically feasible because of the high cost of the catalyst, and the fact that usually the catalyst can be used but once. Production of allyl alcohol via reaction of an aluminum alcoholate with acrolein, followed by hydrolysis of the resulting tri-(allyloxy)aluminum thus does not provide a feasible way of consuming acrolein which has not been condensed.

We now have discovered, however, a particularly advantageous method for accomplishing the useful consumption of the unreacted acrolein after controlled partial conversion of acrolein to allyl acrylate by the Tischenko reaction, our method not involving recycle of the unreacted acrolein. Briefly, we have discovered that if a non-tertiary alcohol is added to the acrolein condensation reaction mixture, the unreacted acrolein is selectively reduced substantially quantitatively to allyl alcohol to the exclusion of all other possible reactions. That is to say, we have discovered that when the non-tertiary alcohol is added to the reaction mixture, condensation of acrolein immediately ceases, and the acrolein is immediately reduced to allyl alcohol, substantially no polymeric materials being formed subsequent to the addition of the non-tertiary alcohol.

We were quite surprised to find that the acrolein not condensed to allyl acrylate was reduced substantially quantitatively to allyl alcohol by reaction with the non-tertiary alcohol, and that the product was a mixture of substantially only allyl acrylate and allyl alcohol. Firstly, nothing in the prior art taught or suggested that the reduction could be carried out so cleanly and completely in such a highly reactive mixture. Secondly, under the conditions used, we had expected that a considerable part of the allyl acrylate would react with the non-tertiary alcohol in an ester interchange reaction to form allyl alcohol and the acyrlic acid ester corresponding to the non-tertiary alcohol. Thus, it is known that aluminum alcoholates are good catalysts for ester interchange reactions, and such reactions are known to proceed at significant rates at the reaction temperatures contemplated for the condensation and reduction of the acrolein. We therefore expected that at least a substantial part of the allyl acrylate would undergo ester interchange with the non-tertiary alcohol. However, we found that, contrary to our expectations, substantially no ester interchange reaction occurs, and that the acrolein not condensed to allyl acrylate is reduced substantially quantitatively to allyl alcohol without any significant amount of ester interchange occurring.

Our discovery provides a highly advantageous method for avoiding recycle of unreacted acrolein, for it does not introduce any desirable side reactions, and converts the unreacted acrolein substantially quantitatively to another valuable product—namely, allyl alcohol. Further, the process provided by our discovery permits a substantially greater choice in the relative amounts of allyl acrylate and allyl alcohol produced from a given amount of acrolein than is permitted where the unreacted acrolein is merely recycled. Thus, any amount of the acrolein charged, up to the maximum permitted by the requirement that substantially no polymeric materials be formed, can be condensed to allyl acrylate, then the remaining acrolein can be reduced to allyl alcohol. A further amount of allyl alcohol can be recovered by hydrolysis of the catalyst.

We have also discovered that if less than the amount of the non-tertiary alcohol required to react with all of the unreacted acrolein is added to the acrolein condensation mixture, substantially quantitative reaction occurs between the non-tertiary alcohol and the stoichiometrically equivalent amount of acrolein. It also has been found that unreacted acrolein can be recovered from such reaction mixtures by very rapidly distilling— preferably flashing—such mixtures to remove the unreacted acrolein, together with allyl acrylate or/and allyl alcohol overhead. Thus, if it should be found desirable to reduce to allyl alcohol but a part of the acrolein remaining after completion of the condensation of the acrolein to allyl acrylate, our discoveries also provide an improved method for accomplishing that desirable result. It will be evident that this result can be accomplished in one of two ways: in one, the non-tertiary alcohol is added when the desired conversion of acrolein has been attained, then acrolein unreacted with the alcohol is flashed off; in the other, when the desired conversion of acrolein has been attained, a part of the unreacted acrolein is flashed off, leaving only sufficient acrolein in the reaction mixture to react with the non-tertiary alcohol to provide the necessary amount of allyl alcohol. The method by which unreacted acrolein may be removed from the reaction mixture by rapid distillation of that mixture is described in detail in copending application Serial No. 783,093 filed December 29, 1958. The pertinent portions of Serial No. 783,093 are incorporated in and made a part of this specification for the purpose of describing that method in more detail.

Our discoveries thus provide a highly efficient, and flexible, process for the preparation of allyl acrylate and allyl alcohol in various ratios from acrolein.

Our invention thus comprises an improvement to the process described in copending application Serial No. 783,094. The combination of our invention with the invention described in that application provides an integrated combination process for effecting substantially quantitative transformation of acrolein to allyl acrylate and allyl alcohol. This combination process involves two integrated process stages. In the first stage, acrolein is condensed to allyl acrylate by an aluminum alcoholate catalyst. In that stage, the conversion of acrolein is deliberately limited to a substantial level at which the products are substantially only monomeric. In the second stage, the acrolein remaining unreacted is reduced to allyl alcohol by a non-tertiary alcohol. Physically, the reduction of the acrolein is effected by addition of the non-tertiary alcohol to the reaction mixture from the acrolein condensation reaction in the first stage.

Since our invention resides only in the improvement to the process of Serial No. 783,094, and to the resulting combination process, in the interest of brevity, we will not describe the process of that application in detail in this specification. To orient our present invention, and to provide its setting, and to demonstrate its relationship to the other process, however, we will describe the process of Serial No. 783,094 briefly herein. To provide a detailed description of the process of Serial No. 783,094 the pertinent portions of that application are incorporated herein and made a part hereof.

Briefly, the process for condensing acrolein to allyl acrylate set out in Serial No. 783,094 requires that acrolein be reacted under substantially anhydrous conditions in the presence of an aluminum alcoholate, and optionally an inert solvent. The reaction is terminated when the conversion of the acrolein has progressed to a substantial, yet limited extent, the extent of the acrolein conversion permitted being determined by the requirement that the product or products of the conversion be monomeric, not polymeric. The reaction is terminated at or just before the point at which polymeric products begin to form in substantial amounts. The amount of catalyst used may be as much as 0.10 but preferably is less than about 0.05, but greater than about 0.001 mole per mole of the acrolein charged. The reaction is conducted at temperatures of from about 0° C. to about 65° C., but preferably is conducted at a temperature of about 30° C. (e.g., from about 15° C. to about 45° C.). High (e.g., 85% or more) yields of monomeric products result if the acrolein conversion is not permitted to exceed about 25%, 42%, 65%, and 85%, respectively, at catalyst concentrations of 0.001, 0.01, 0.05 and 0.10 mole per mole of acrolein, respectively. To obtain substantially quantitative yield (that is, 95% or more) of monomeric products, the maximum conversion of acrolein permitted is about 18%, about 30% and about 55%, respectively, at catalyst concentrations of about 0.001, 0.01 and 0.05 mole per mole of acrolein, respectively. Other values are obtained by interpolation or extrapolation of one of the smooth curves joining the cited values. The preferred catalysts are the alcoholates of aluminum with isopropyl alcohol and with secondary butyl alcohol, respectively.

According to one aspect of our invention, the condensation of acrolein is terminated when desired, and the acrolein remaining unreacted is reduced substantially quantitatively to allyl alcohol, by adding a non-tertiary alcohol to the acrolein condensation reaction mixture when it is desired to terminate the acrolein condensation reaction.

According to another aspect of our invention, a part of the acrolein remaining unreacted when the acrolein condensation reaction has reached the desired termination point is reduced to allyl alcohol by the addition of the stoichiometric amount of a non-tertiary alcohol to the reaction mixture, then any acrolein remaining unreacted after reaction with the alcohol is complete is recovered— conveniently by flashing the volatile materials from the catalyst and any materials boiling at a temperature above the boiling temperature of the catalyst.

According to still another aspect of our invention, a part of the acrolein remaining unreacted when the acrolein condensation reaction has reached the desired termination point is flashed from the reaction mixture, leaving only sufficient acrolein in that mixture to react with the non-tertiary alcohol to form the desired amount of allyl alcohol.

As used herein, the term "flashing" has the meaning set out in copending application Serial No. 783,093. That is, "flashing" means a distillation conducted under such conditions—usually by reduction in pressure—that the desired material rapidly vaporizes and distills overhead.

In conducting the reaction between the non-tertiary alcohol and the acrolein, it has been found that in most cases, all that is necessary is to add the alcohol to the acrolein condensation reaction mixture and raise the temperature of the mixture slightly to obtain the necessary reaction rates. That is to say, the catalyst and the amount of catalyst used in the acrolein condensation reaction also are suitable in the acrolein reduction reaction, and the presence of allyl acrylate does not interfere with the production of allyl alcohol. It has been found that the optimum reaction temperatures used in the reduction reaction usually are somewhat—about 20–40° C.—higher than the optimum temperatures used in the condensation reaction. Where a higher temperature is to be used in the reduction reaction than in the condensation reaction, it is preferred that the alcohol be added to the condensation reaction mixture before the increase in reaction temperature is effected—this technique minimizes undesirable side reactions productive of useless polymeric materials.

Thus, the suitable catalysts are the aluminum alcoholates described in Serial No. 783,094, the preferred catalysts being the alcoholates of aluminum and isopropyl alcohol, and of aluminum and secondary butyl alcohol, respectively. Where possible, it is preferred to employ as catalyst the aluminum alcoholate corresponding to the alcohol used as reducing agent; such is not essential to the success of the process, however.

Any suitable amount of catalyst may be used in effecting reduction of the acrolein by the non-tertiary alcohol, and the amount of catalyst used to effect the reduction may be greater than the amount of catalyst used in effecting the condensation of acrolein. That is, following the condensation reaction, additional catalyst may be added with the non-tertiary alcohol. Or, because acrolein is consumed in the condensation reaction, and/or because acrolein may be removed after the condensation reaction is complete and before the non-tertiary alcohol is added, the catalyst concentration (based on acrolein present) in the reduction reaction will be greater than the catalyst concentration in the condensation reaction. In general, however, the catalyst concentrations used in effecting the acrolein condensation reaction ordinarily are most suitable in effecting the acrolein reduction reaction. Thus, at least 0.001 mole of catalyst per mole of acrolein ordinarily will be required to provide the desired reaction rates, while more than 0.10 mole of catalyst per mole of acrolein ordinarily will be the economic maximum concentration of catalyst, while catalyst concentrations within the range of from about 0.001 to about 0.05 mole per mole of acrolein will be found to be most suitable. The catalyst concentration selected for use in the condensation reaction can be determined with the thought in mind of providing a suitable catalyst concentration for use in the reduction reaction.

Should a solvent have been used in the acrolein condensation reaction, that solvent may be allowed to remain during the acrolein reduction reaction—the solvent will not interfere with the reduction reaction. In fact, the presence of a solvent in the reduction reaction mixture may be convenient or desirable. Should it be that no solvent was used in the acrolein condensation reaction, it may be desirable to add a suitable solvent before the non-tertiary alcohol is added. In some cases, it may be desirable to provide an entraining or azeotroping agent in the reaction mixture to aid in recovery of the products and/or unreacted acrolein from that mixture. Suitable solvents and entraining or azeotroping agents are those which are suitable in the acrolein condensation reaction. The material chosen as solvent and/or entraining or azerotroping agent preferably boils at a temperature substantially different from the boiling points of the ester product, the unreacted aldehyde, and the aluminum alcoholate used as catalyst. These requirements must be met in order that the solvent and/or entraining agent can be readily separated from the other components of the system. The preferred entraining or azeotroping agents are the aromatic hydrocarbons, such as benzene, toluene, xylenes, and the like, or mixtures of such aromatic hydrocarbons, of appropriate boiling point, or boiling point ranges.

Reduction of the acrolein is effected by non-tertiary alcohols—i.e., primary and secondary alcohols, which are characterized by at least one hydrogen atom bonded directly to the carbon atom to which an alcoholic hydroxyl group is directly bonded. The term alcohol is used in its usual meaning: a compound containing a non-acidic hydroxyl group. Suitably the alcohol used may be monohydric or it may be polyhydric. It is preferred, of course, that the alcohol chosen in any particular instance be free from substituent groups which are reactive with acrolein under the process conditions, so that undesirable side reactions will not occur. For this reason, and because of their ready availability at low cost, it is preferred that other than the alcoholic hydroxyl group or groups, the alcohol be composed only of carbon and hydrogen, with the monohydric and polyhydric alkyl alcohols of up to about 18 carbon atoms being most preferable. While the suitable alcohols may be either saturated or unsaturated, it is preferred that the alcohol used be free from olefinic unsaturation, particularly acetylenic unsaturation. The suitable alcohols can be of either straight-chain or branched-chain configuration, and may contain in their structure either or both of alicyclic or aromatic carbon-to-carbon moieties. Examples of suitable alcohols thus include methanol, ethanol, n-propanol, n-butanol, n-pentanol, n-hexanol, 1-octanol, 2-ethyl-1-hexanol, 1-decanol, ethylene glycol, propylene glycol and like straight-chain primary alcohols, isobutyl alcohol, isoamyl alcohol, sec-butylcarbinol and like branched-chain primary alcohols, isopropyl alcohol, sec-butyl alcohol, sec-amyl alcohol, diethyl carbinol, 2-octanol, 5-ethyl-2-nonanol, 5-methyl-3-heptanol, 7-ethyl-2-methyl-4-undecanol, 3,9-diethyl-6-tridecanol, diisobutyl carbinol, cyclohexanol and like secondary alcohols, cyclohexylcarbinol, 2-cyclohexyl-ethan-1-ol, and like alicyclic-substituted primary alcohols, benzyl alcohol, phenethyl alcohol and like aralkyl primary alcohols. The secondary alcohols tend to be somewhat more reactive than do the primary alcohols; consequently, the secondary alcohols, and most desirably, secondary alcohols of from 3 to 10 carbon atoms, are preferred. Still more preferably the secondary alcohol used is an alkanol.

Although the acrolein reduction can be carried out at temperatures somewhat higher or lower, it is preferred to use temperatures within the range of from about 40° C. to about 60° C.

The amount of non-tertiary alcohol added will be determined by the amount of acrolein it is desired to reduce. Since the alcohol reacts substantially quantitatively with the acrolein, the amount of alcohol added corresponds, mole for mole, to the amount of acrolein it is desired to reduce. Where it is desired to reduce all of the acrolein, such is insured by the use of a slight excess of alcohol over that required by stoichiometric relations to reduce all of the acrolein. The excess need not exceed about 100%, and in most cases no more than a 50% excess will be necessary.

The acrolein reduction reaction proceeds at a rapid rate; consequently, reaction times in excess of about 60 minutes will be found to be seldom necessary, and in many, if not most cases a reaction time of 30–40 minutes will be quite sufficient. The reaction mixture should be not be maintained in contact with the catalyst any longer than is necessary to insure the completion of the reaction.

Because water has a pronounced deleterious effect on both the acrolein condensation reaction and the acrolein reduction reaction when using only the small catalytic amounts of aluminum alcoholate required by the invention, it is highly desirable to employ anhydrous reactants and to protect the reaction system from any contamination with moisture.

In addition to the allyl alcohol formed by reduction of the acrolein, an aldehyde or ketone is produced from the primary or secondary alcohol employed as hydrogen donor in the process. For example, when acrolein is reacted with isopropyl alcohol according to the process of the invention, allyl alcohol and acetone are produced, while propionaldehyde is produced when acrolein is reacted with n-propanol. Similarly, methyl ethyl ketone is produced from secondary butyl alcohol and methyl isobutyl ketone is produced from methyl isobutyl carbinal. The aldehydes or ketones which are thus formed are valuable by-products which can be separated from the allyl alcohol and marketed. Alternatively, the aldehydes or ketones can be hydrogenated by known methods in a separate step to convert them back to the corresponding primary or secondary alcohols which can then be recycled to the process of the invention.

Where less than all of the acrolein unreacted in the condensation reaction is to be reduced to allyl alcohol, two methods are available for effecting recovery of the acrolein which is not to be reduced. In one method, following completion of the condensation reaction, the reaction mixture is flashed to effect removal of the acrolein which is not to be reduced, then the remaining reaction mixture is reacted with the non-tertiary alcohol to effect reduction of the acrolein therein. In the second method, the necessary amount of non-tertiary alcohol is added to the reaction mixture following completion of the condensation reaction, then the unreacted is recovered, preferably by flashing.

Details of the "flash" method for removing the unreacted acrolein from the reaction mixture are set out in copending application Serial No. 783,093. The chief advantage of that method of recovering acrolein, and other volatile materials (boiling below the boiling point of the catalyst used) is that it avoids contamination of the unreacted acrolein with water, so that if desired the acrolein can be recycled directly to the condensation reaction, or other reaction, avoiding the complicated and expensive removal of water from the acrolein.

Following completion of the acrolein reduction reaction, the manner in which recovery of the products is effected will depend upon whether unreacted acrolein remains or not. If substantially all of the acrolein has been reacted, then the reaction mixture may be worked up by first adding sufficient water, aqueous strong base or strong acid to hydrolyze the catalyst, then distilling the products from the mixture, and recovering the various products by known methods such as by distillation, extraction or the like, as may be convenient. If there remains a substantial amount of acrolein unreacted (or as an alternative procedure that may be used also when substantially all of the acrolein has been reacted), as has already been pointed out herein, the unreacted acrolein and the ester and alcohol products are most conveniently recovered from the reaction mixture by flash distillation, or other distillation under conditions such that the volatile materials are rapidly removed from the catalyst.

A further advantage of the "flashing" method for effecting separation of the catalyst is that it permits the ready re-use of the catalyst should such be found desirable. However, it must be pointed out that, for reasons set out in detail in copending application Serial No. 783,094, the tri(allyloxy)aluminum which is formed by reaction of the aluminum alcoholate originally charged to the acrolein condensation reaction and the acrolein, and which appears to be the active catalyst for condensing acrolein, may further react or complex with any polymeric material that may be formed during the acrolein condensation, and the complex not only fails to catalyze the condensation of acrolein but promotes polymerization of acrolein. Since usually a small amount of such polymeric material and such complexing of the catalyst is unavoidably produced, in most cases it will be found undesirable to re-use the catalyst finally recovered. Treatment of the catalyst with water or aqueous strong acid such as sulfuric acid or strong base such as sodium hydroxide enables recovery of the allyloxy groups of the catalyst as allyl alcohol.

Separation of the various components of the overhead product of the distillation can be effected by known methods such as by distillation, extraction, or the like, as may be convenient.

The foregoing constitutes the description of our invention. Application of the process which embodies the invention in particular instances is illustrated by the following examples. It is to be understood that these examples are included only for the purpose of illustrating our invention, and are not intended and are not to be construed as limiting the invention in any way not specifically recited in the appended claims.

*Example I*

Acrolein was mixed with 30% of its weight of xylene and with 0.079 mole of tri(isopropoxy)aluminum per mole of the acrolein. The mixture was held at 30° C. for one hour. Then isopropyl alcohol was added, in a ratio of 2 moles of alcohol per mole of acrolein originally charged, and the resulting mixture heated to and held at 50° C. for an additional one hour. The final reaction mixture was distilled, and the overhead product fractionally distilled. It was found that all of the acrolein charged had been converted. There was obtained a yield of 29% of allyl acrylate. There was also obtained a total yield of allyl alcohol (including the allyl alcohol resulting from hydrolysis of the catalyst) of 63%.

*Example II*

A mixture of acrolein, 30% of its weight of xylene and 0.08 mole per mole of the acrolein of tri(sec-butoxy)-aluminum, was maintained at 20° C. for 3 hours. Then there was added 0.12 mole of secondary butyl alcohol per mole of acrolein originally charged. The resulting mixture was heated to 50° C. and held at that temperature for one-half hour. The mixture then was flashed to remove unreacted acrolein, and other volatiles. It was found that 37% of the acrolein had been converted. There was obtained a yield of 60% allyl acrylate and a yield of 40% allyl alcohol (including allyl alcohol derived from the catalyst).

We claim as our invention:

1. A process for the production of allyl acrylate and allyl alcohol from acrolein, which process comprises condensing, under substantially anhydrous conditions, acrolein to allyl acrylate in the presence of, as catalyst, from about 0.001 to about 0.10 mole of an aluminum alcoholate per mole of the acrolein, limiting the conversion of acrolein to a substantial level not exceeding a maximum varying from about 25% at a catalyst concentration of about 0.001 mole per mole of acrolein to about 85% at a catalyst concentration of about 0.10 mole per mole of acrolein, then adding a non-tertiary alcohol to the resulting reaction mixture to convert acrolein in said mixture to allyl alcohol.

2. A process according to claim 1 wherein the amount of non-tertiary alcohol added is at least the amount required stoichiometrically to react with all of the acrolein in the reaction mixture.

3. A process according to claim 1 wherein the amount of non-tertiary alcohol added is sufficient to react with but a part of the acrolein in the reaction mixture.

4. A process according to claim 3 wherein the acrolein remaining unreacted after the non-tertiary alcohol has been reacted is removed from the reaction mixture by distillation of that mixture under conditions such that the acrolein is rapidly removed from the mixture.

5. A process according to claim 3 wherein the acrolein contemplated to remain unreacted with the non-tertiary alcohol is removed from the reaction mixture prior to addition of the non-tertiary alcohol, said removal being effected by distillation of the reaction mixture under conditions such that the acrolein is rapidly removed from the mixture.

6. A process according to claim 10 wherein the amount of secondary alcohol added is at least the amount required stoichiometrically to react with all of the acrolein in the reaction mixture.

7. A process according to claim 10 wherein the amount of secondary alcohol added is sufficient to react with but a part of the acrolein in the reaction mixture.

8. A process according to claim 7 wherein the acrolein remaining unreacted after the secondary alcohol has been reacted is removed from the reaction mixture by distillation of that mixture under conditions such that the acrolein is rapidly removed from the mixture.

9. A process according to claim 7 wherein the acrolein contemplated to remain unreacted with the secondary alcohol is removed from the reaction mixture prior to addition of the secondary alcohol, said removal being effected by distillation of the reaction mixture under conditions such that the acrolein is rapidly removed from the mixture.

10. A process for the production of allyl acrylate and allyl alcohol from acrolein, which process comprises condensing, under substantially anhydrous conditions, acrolein to allyl acrylate in the presence of, as catalyst, from about 0.001 to about 0.10 mole of an aluminum alcoholate per mole of the acrolein, limiting the conversion of acrolein to a substantial level not exceeding a maximum varying from about 25% at a catalyst concentration of about 0.001 mole per mole of acrolein to about 85% at a catalyst concentration of about 0.10 mole per mole of acrolein, then adding a secondary alcohol to the resulting reaction mixture to convert acrolein in said mixture to allyl alcohol.

References Cited in the file of this patent

UNITED STATES PATENTS

| | | |
|---|---|---|
| 2,516,627 | Hearne et al. | July 25, 1950 |
| 2,774,792 | Carlson et al. | Dec. 18, 1956 |

FOREIGN PATENTS

| | | |
|---|---|---|
| 945,984 | Germany | July 19, 1956 |

OTHER REFERENCES

Hine: "Physical Organic Chemistry," 1956, pp. 261–263.